Nov. 5, 1963   C. E. HALLMARK   3,109,974
MACHINE TOOL CONTROL SYSTEM HAVING FEEDRATE CONTROL
Filed June 19, 1961   5 Sheets-Sheet 3
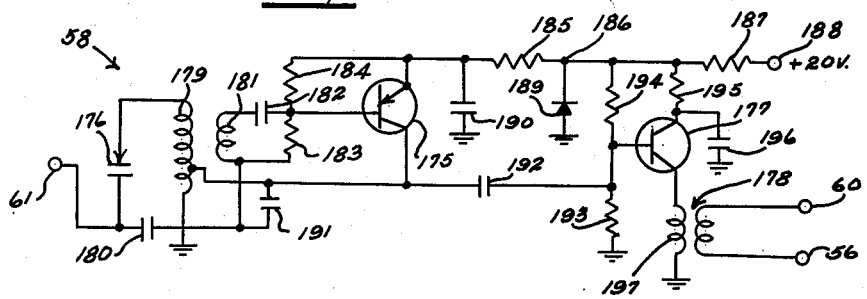
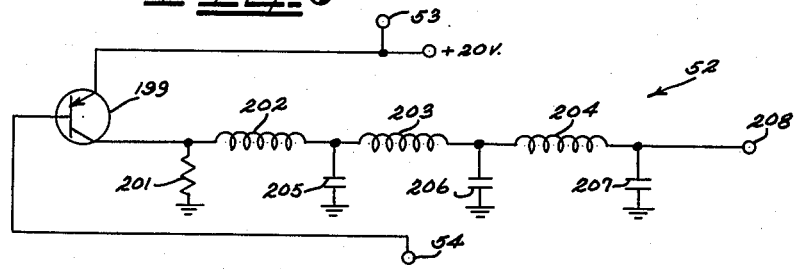
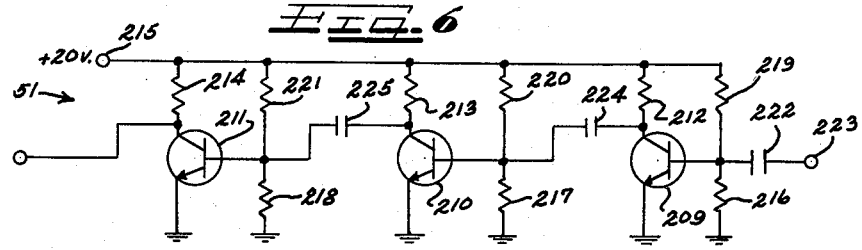
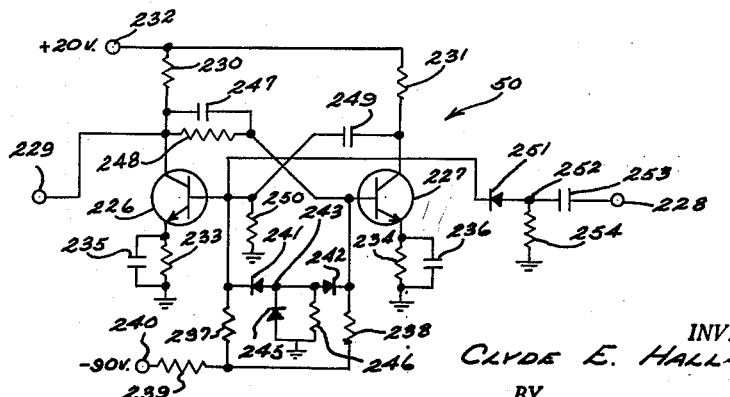
INVENTOR.
CLYDE E. HALLMARK
BY
*Hill, Sherman, Meroni, Gross & Simpson*
ATTORNEYS Nov. 5, 1963  C. E. HALLMARK  3,109,974
MACHINE TOOL CONTROL SYSTEM HAVING FEEDRATE CONTROL
Filed June 19, 1961  5 Sheets-Sheet 4
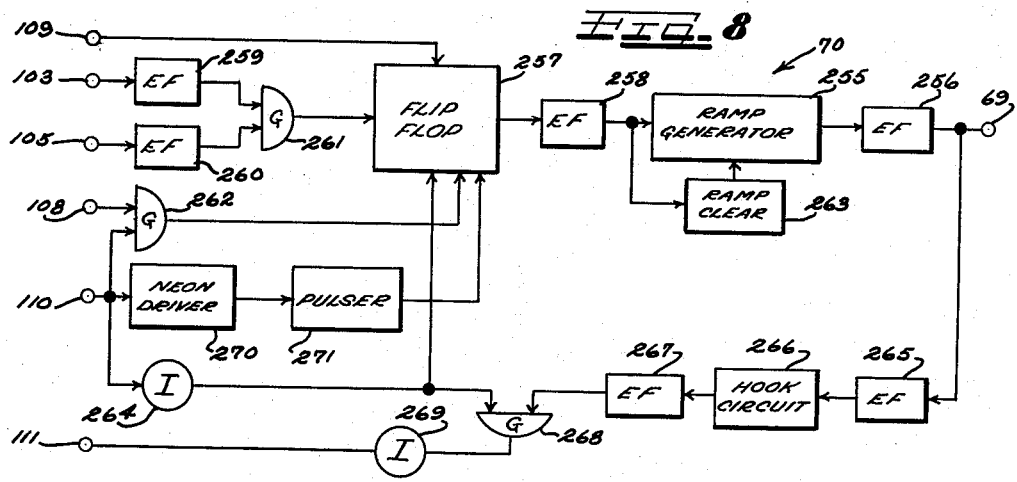
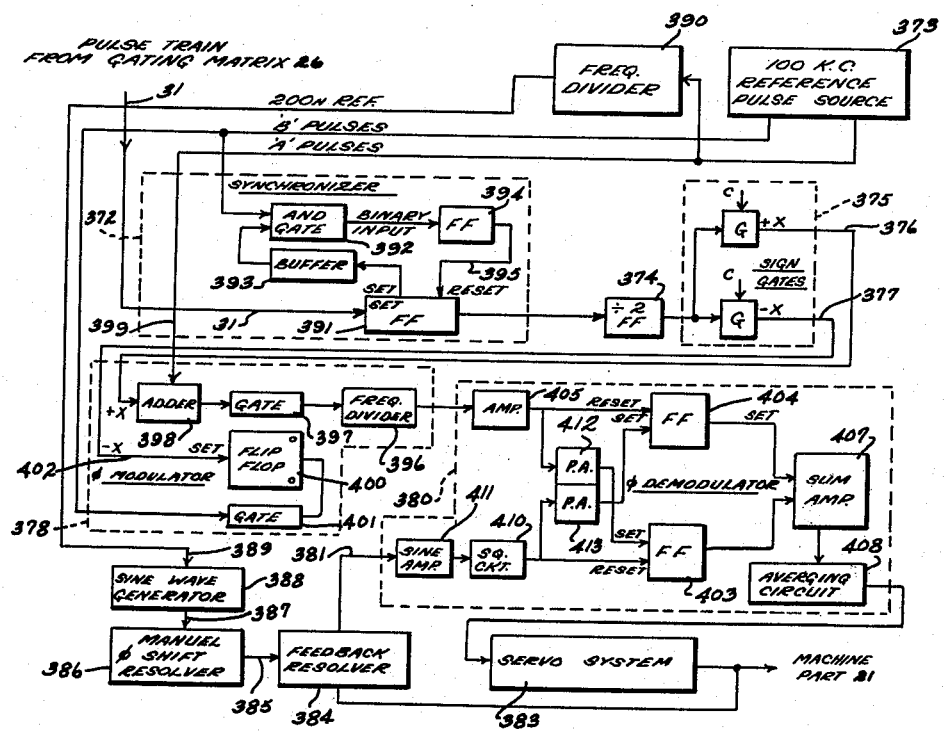
INVENTOR.
CLYDE E. HALLMARK
BY
ATTORNEYS

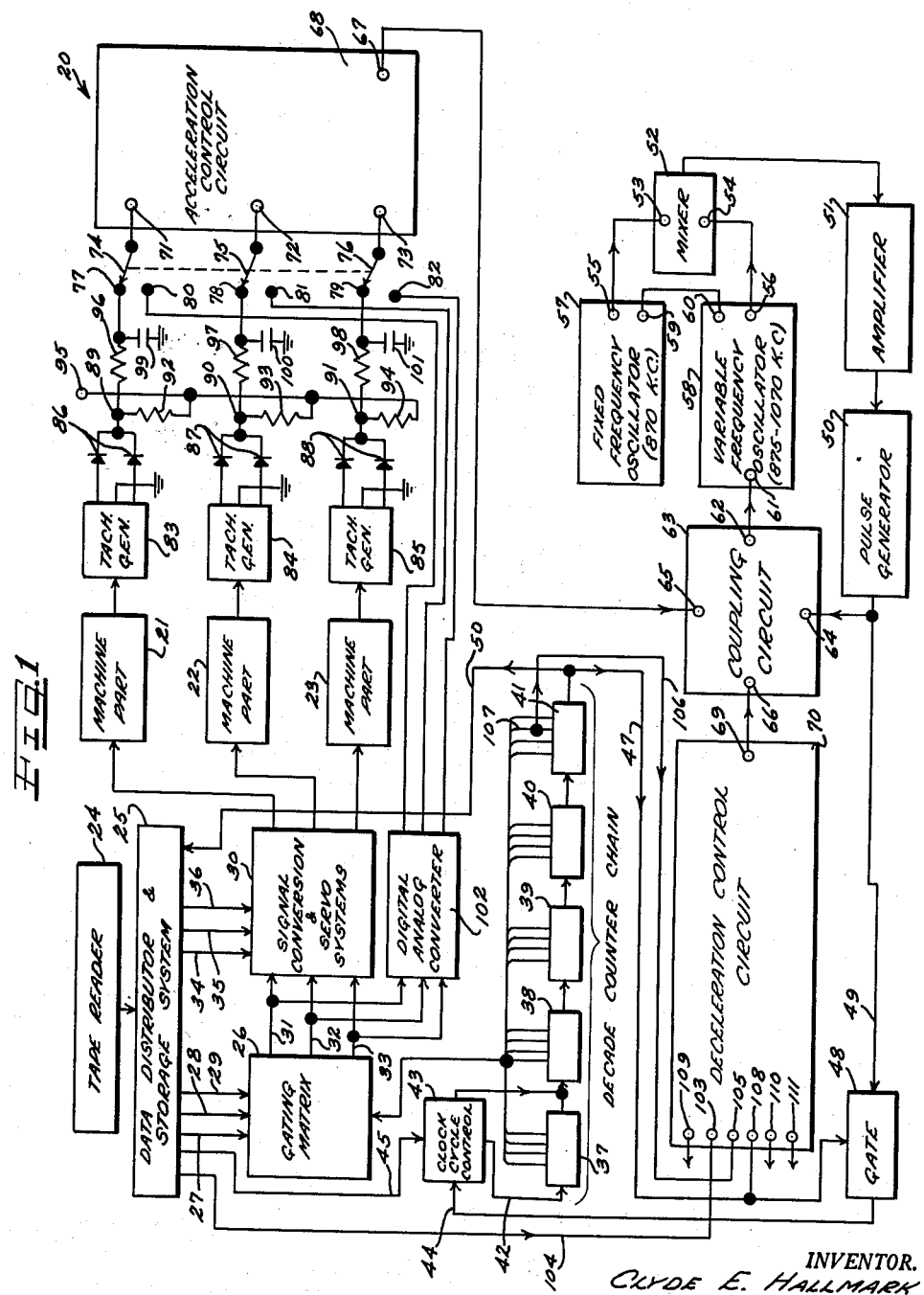

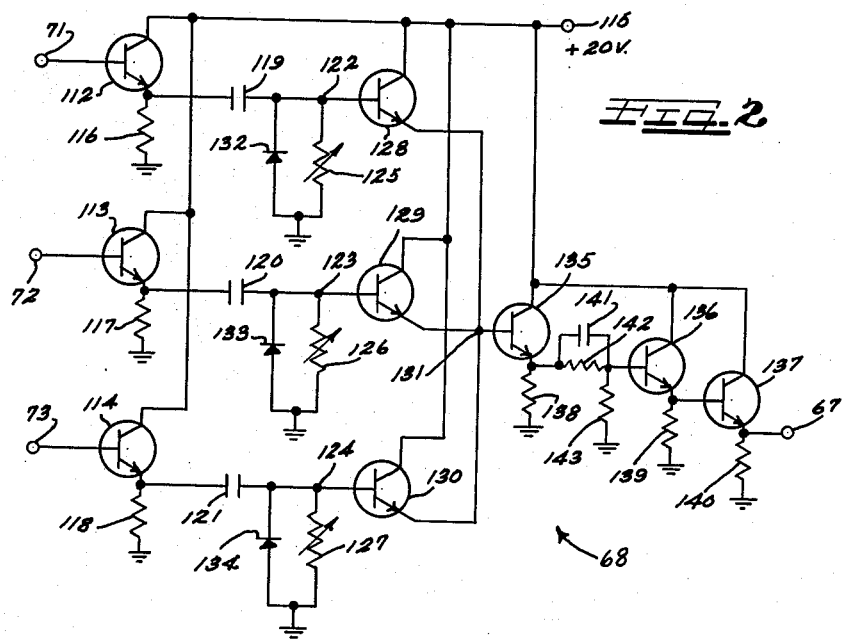

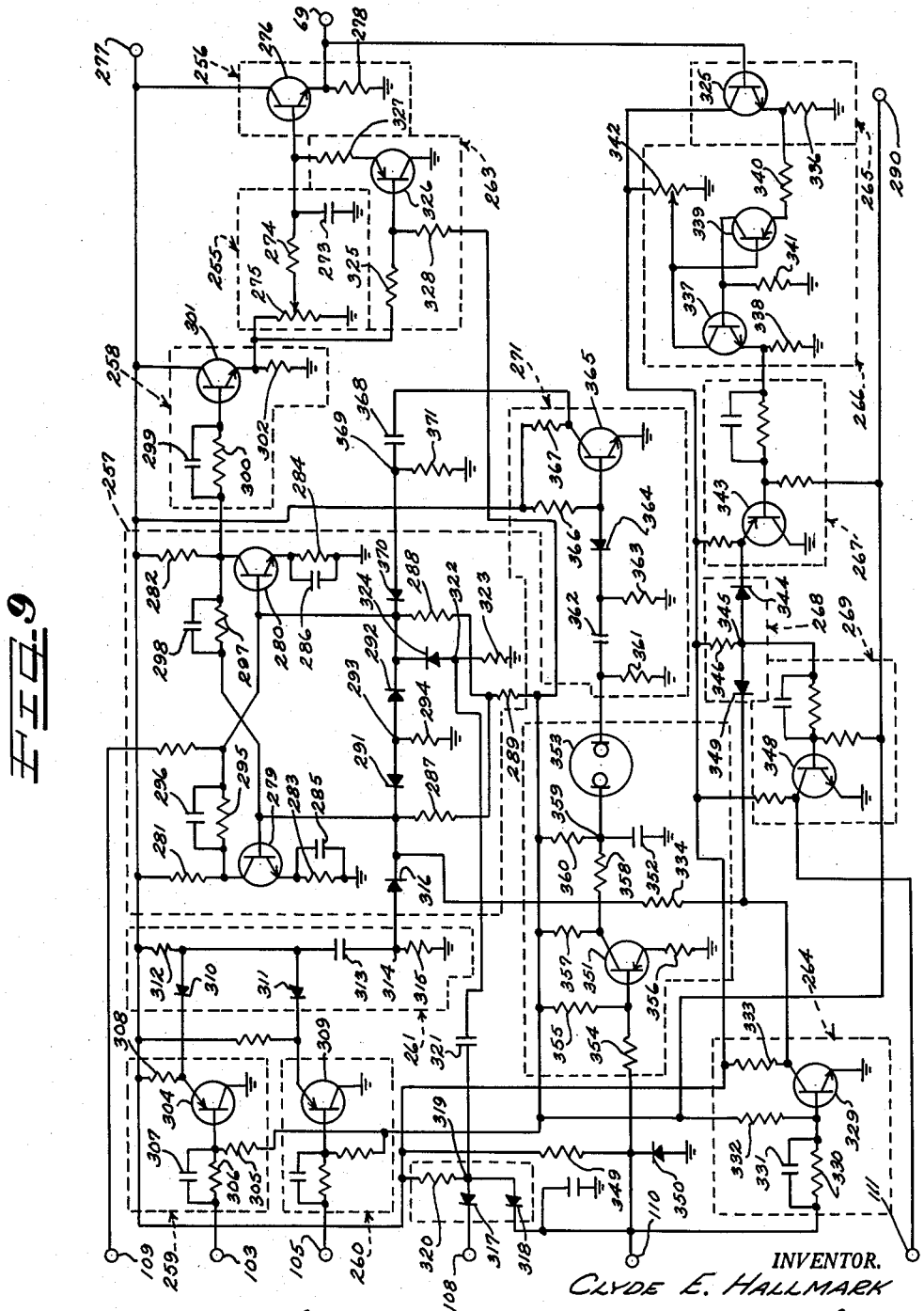

United States Patent Office 3,109,974
Patented Nov. 5, 1963

3,109,974
MACHINE TOOL CONTROL SYSTEM HAVING
FEEDRATE CONTROL
Clyde E. Hallmark, New Haven, Ind., assignor to Thompson Ramo Wooldridge Inc., Cleveland, Ohio, a corporation of Ohio
Filed June 19, 1961, Ser. No. 118,155
15 Claims. (Cl. 318—163)

This invention relates to an automatic control system for machine tools or the like wherein a high speed of movement of an element may be programmed, without damage to or malfunction of servo system components and without loss of accuracy.

The arrangement of this invention has other applications but was particularly designed for an automatic machine tool control system, wherein servo systems are controlled in accordance with a block of information on a section of punched tape, to move a machine tool element a certain distance along or about each of a plurality of axes of movement, in a certain interval of time. For example, in milling a particular part a cutting tool may be moved vertically a distance of 1.2547 inches in an interval of five seconds and in one horizontal direction a distance of 0.0036 inch. In the same five second interval, a worktable of the machine may be moved in a transverse horizontal direction a distance of 2.7405 inches and a workholder on the worktable may be moved about a horizontal axis through an angular distance of of 3°. Such movements are obtained by punching holes at appropriate positions in tape fed to a tape reader.

With such machine tool control systems, it would oftentimes be desirable to be able to program a comparatively large amount of movement of an element at a rapid rate of speed, but the prior art systems have been quite limited with respect to speed. It is found in particular that when too high a speed is programmed, a loss of synchronism or accuracy is apt to result and overshoot is also apt to result. Damage can result both to system components and to the part being machined.

According to this invention, a feedrate override arrangement is provided wherein the speed of travel of a controlled element is gradually increased until a programmed speed is reached and thereafter gradually decreased as a stopping point is approached. With this arrangement, it is possible to program a speed which is much higher than could otherwise be programmed, without damage to or malfunction of servo system components and without loss of accuracy.

An important feature of the invention relates to arrangements for obtaining the gradual speed changes in a comparatively simple but very reliable manner.

According to a more specific feature of the invention, the control of the speed increase or acceleration at the beginning of a programmed movement is accomplished automatically by providing an acceleration signal feedback loop which controls a feedrate generator. This loop may be introduced or switched in at any time an acceleration signal exceeds a pre-set threshold value. In one preferred arrangement, a tachometer generator provides a velocity signal which is differentiated to obtain the acceleration signal. In another preferred arrangement, a velocity command signal applied to a servo system is differentiated to obtain the acceleration signal.

According to another specific feature of the invention, the gradual speed decrease or deceleration is controlled from a programmed code on the punched tape, and the action is initiated at a predetermined point of a command cycle.

Other important features of the invention relate to the specific means for obtaining and utilizing the speed and acceleration signals, to the particular means by which feedrate may be controlled in response to control signals and to an emergency stop feature.

This invention contemplates other objects, features and advantages which will become more fully apparent from the following detailed description taken in conjunction with the accompanying drawings which illustrate a preferred embodiment and in which:

FIGURE 1 is a block diagram of a machine tool control system which includes the feedrate override arrangement of this invention;

FIGURE 2 is a circuit diagram of an acceleration control circuit shown in block form in FIGURE 1;

FIGURE 3 is a circuit diagram of a coupling circuit shown in block form in FIGURE 1;

FIGURE 4 is a circuit diagram of a variable frequency oscillator shown in block form in FIGURE 1;

FIGURE 5 is a circuit diagram of a mixer circuit shown in block form in FIGURE 1;

FIGURE 6 is a circuit diagram of an amplifier circuit shown in block form in FIGURE 1;

FIGURE 7 is a circuit diagram of a pulse generator shown in block form in FIGURE 1;

FIGURE 8 is a block diagram of the deceleration control circuit of FIGURE 1;

FIGURE 9 is a circuit diagram of the deceleration control circuit shown in block form in FIGURE 8; and FIGURE 10 is a block diagram showing a signal conversion and servo system for one channel of the system of FIGURE 1.

FIGURE 1 is a block diagram of a machine tool control system, arranged to be controlled by a punched tape or the like to control movements of three machine parts 21, 22 and 23. In general, the system 20 comprises a tape reader 24 which reads a block of information from the tape and supplies it to a data distributor and storage system 25. The system 25 controls a gating matrix 26, through lines 27, 28 and 29 as diagrammatically illustrated, to cause the simultaneous generation of three trains of pulses, which are applied to signal conversion and servo systems 30 through lines 31, 32 and 33. The systems 30 move the machine parts 21, 22 and 23 through distances corresponding to the numbers of pulses in the trains developed on lines 31, 32 and 33. By way of example, each pulse may cause a movement through a distance of 0.0001 inch. The direction of movement is controlled by sign information applied to the systems 30 from the storage system 25, through lines 34, 35 and 36.

By way of example, a train of 82,412 pulses may be developed on the line 31 in a five second interval to cause movement of the machine part 21 through a distance of 8.2412 inches. During the same interval, a train of 5,436 pulses may be developed on the line 32 to cause movement of the machine part 22 through a distance of 0.5436 inch, and a train of 27,621 pulses may be developed on the line 33 to cause movement of the machine part 23 through a distance of 2.7621 inches.

To generate such trains of pulses, the gating matrix 26 is supplied with a total of 100,000 pulses in a given interval (for example five seconds) from twenty control lines connected to outputs of a decade counter train consisting of five decade counters 37, 38, 39, 40 and 41 connected in cascade. The gating matrix 26 operates to apply controllable fractions of the input pulses to the lines 31, 32 and 33, according to control operation applied to the gates thereof through the lines 27, 28 and 29. Pulses are applied to the first counter 37 through a line 42 connected to a clock cycle control circuit 43, to which pulses are applied through a line 44. The clock cycle control circuit 43 operates as a frequency divider, with the division factor being controlled by information applied thereto through line 45, from the data distributor and storage system 25. By way of example, pulses may be applied through line 44 to the clock cycle control 43 at a 100 kc. rate and a divide-by-five signal may be applied through line 45, to cause application of pulses through the line 42 to the first decade counter 37 at a 20 kc. rate. Under such conditions, the decade counter chain completes a cycle of operation in five seconds. In some circumstances, pulses may be applied from the clock cycle control 43 to the input of the second decade counter 38 through a line 46, rather than to the input of the first decade counter 37.

When the decade counter chain completes a cycle of operation, an end carry signal is applied through a line 47 to a gate circuit 48 to terminate application of pulses to the clock cycle control 43, input pulses being applied to the gate circuit 48 through a line 49. At the same time, the end carry signal is applied through line 50 to the data distributor and storage system 25 to cause application to the various circuits of signals corresponding to information read from another block of information on the tape. The gate 48 may then after a slight delay be opened to again apply pulses to the decade counter chain, through the clock cycle control circuit 43.

The system as thus far described does not constitute the present invention, but certain features thereof are of importance. Of primary importance is the fact that the instantaneous rates of the pulses in the pulse trains generated on the lines 31, 32 and 33 are proportional to the rate of application of pulses on the line 49, multiplied by the respective values of the control signals applied from the program or data distributor and storage system 25 to the matrix 26. Thus the rate of movement of a machine tool element may be controlled by controlling the frequency or rate of pulses applied on the line 49.

According to this invention, the speed of travel of a controlled element is gradually increased until a programmed speed is reached and is thereafter gradually decreased as a stopping point is approached, so as to make it possible to program a speed which is much higher than could otherwise be programmed, without damage to or malfunction of servo system components and without loss of accuracy.

In the illustrated system, the speed changes are accomplished by changing the rate or frequency of pulses applied to the line 49. In particular, to a pulse generator 50, in the form of a monostable multivibrator having a circuit as illustrated in FIGURE 7, generates pulses of a certain amplitude and of a certain duration, preferably on the order of one microsecond. The pulse generator 50 is triggered by a signal applied thereto from an amplifier 51 which has its input connected to a mixer circuit 52. Mixer 52 has a pair of input terminals 53 and 54 connected to output terminals 55 and 56 of a pair of oscillators 57 and 58, other terminals 59 and 60 of the oscillators being connected together so that the outputs of the oscillators and the input of the mixer are connected in series.

Th eoscillator 57 is operated at a fixed frequency, preferably 870 kc., while the oscillator 58 is operated at a variable frequency, preferably through a range from 875 to 1070 kc. The mixer 52 develops an output signal at a frequency equal to the difference between the frequencies of the oscillators 57 and 58. Thus with the oscillator 57 operated at a frequency of 870 kc. and with the oscillator 58 operated through a range from 875 to 1070 kc., the mixer 52 develops a frequency of from 5 kc. to 200 kc.

The variable frequency oscillator 58 has an input terminal 61 to which a D.C. control signal is applied from an output terminal 62 of a coupling circuit 63, to control the frequency of the oscillator 58. The coupling circuit 63 has three input terminals 64, 65 and 66. Terminal 64 is connected to the output of the pulse generator 50. Terminal 65 is connected to an output terminal 67 of an acceleration control circuit 68, and terminal 66 is connected to an output terminal 69 of a deceleration control circuit 70.

In the absence of signals from the acceleration and deceleration control circuits, the variable frequency oscillator 58 is controlled solely by the signal applied to input terminal 64 from the output of the pulse generator 50. This signal functions to limit or stabilize the output of the variable frequency oscillator at a certain value such as, for example, 1070 kc. Thus if the frequency of the variable frequency oscillator 58 should tend to rise above 1070 kc., the output of the mixer 52 would tend to rise above 200 kc., and the average output of the pulse generator 50 would increase the pulses at the output thereof being of constant amplitude and duration. With an increased signal applied to the input terminal 64 of the coupling circuit 63 and through the coupling circuit to the input terminal 61 of the variable frequency oscillator, the output of the variable frequency oscillator is decreased. This stabilization of the frequency is an important specific feature of the invention.

The acceleration control circuit 68 normally functions during the initial portion of a programmed movement to limit the rate of movement of a machine part. The acceleration control circuit functions by applying to the input terminal 65 of the coupling circuit 63, and through the coupling circuit to the input terminal 61 of the variable frequency oscillator, a signal which reduces the output frequency of the variable frequency oscillator, to thereby reduce the frequency of the signal developed on the line 49.

To develop its control signal, the acceleration control circuit has three input terminals 71, 72 and 73 to which signals are applied which are respectively proportional to the speeds of movement of the machine parts 21, 22 and 23. The circuit 68 responds to such speed signals to develop acceleration signals and then responds to the acceleration signal having the highest amplitude. When such an acceleration signal exceeds a certain threshold value, a signal proportional thereto is developed at the output terminal 67 which is applied through the coupling circuit 63 to the variable frequency oscillator 58, to reduce the frequency of the oscillator 58 and thereby limit the acceleration of the machine part having the highest rate of acceleration.

The input terminals 71, 72 and 73 of the acceleration control circuit 68 are connected to ganged selector switch contacts 74, 75 and 76 which are respectively engageable either with fixed contacts 77, 78 and 79, or with fixed contacts 80, 81 and 82. Speed signals are developed at the contacts 77, 78 and 79 in response to movement of the machine parts 21, 22 and 23. In particular, three bipolar tachometer generators 83, 84 and 85 are mechanically coupled to the machine parts 21, 22 and 23. Neutral terminals of the generators are grounded while the other terminals thereof are respectively connected through diode pairs 86, 87 and 88 to circuit points 89, 90 and 91. Circuit points 89, 90 and 91 are connected through resistors 92, 93 and 94 to a terminal 95 arranged to be connected to a source of biasing potential. Circuit points 89, 90 and 91 are also connected through resistors 96, 97 and 98 to the switch contacts 77, 78 and 79, capacitors 99, 100 and 101 being connected between contacts 77, 78 and 79 and ground.

In operation, signals are developed at the circuit points 89, 90 and 91 proportional to the speeds of movement of the machine parts 21, 22 and 23, regardless of the direction of movement because of the bipolar arrangement with the diodes 86–88. Such speed signals are developed at the switch contacts 77–79, with the resistors 96–98 and capacitors 99–101 operating as noise filters.

Speed signals are also developed at the switch contacts 80, 81 and 82, but not in direct response to movement of the machine parts 21, 22 and 23. Instead, contacts 80, 81 and 82 are connected to outputs of a digital-analog converter 102 having input terminals connected to the lines 31, 32 and 33 at the output of the gating matrix 26. The digital-analog converter 102 operates to generate signals proportional to the pulse rates of the pulse trains developed on the lines 31, 32 and 33.

The deceleration control circuit 70 is rendered operative when a signal is applied thereto to an input terminal 103 thereof over a line 104 from the data distributor and storage system 25. When rendered operative, the deceleration control circuit 70 responds to a signal applied to another input terminal 105 thereof, connected through a line 106 to an output line 107 of the last counter 41 of the decade counter chain. A signal is developed at the output line 107 at a certain intermediate point in the cycle of operation of the decade counter chain, such as a 40% point.

With signals applied to the input terminals 103 and 105, the deceleration control circuit 70 develops a signal which is applied through the coupling circuit 63 to the input of the variable frequency oscillator, to gradually decrease its frequency and to produce a relatively low frequency on the control line 49 at the end of the cycle of operation of the decade counter chain. For example, the frequency may be gradually reduced from 200 kc. down to 5 kc.

At the end of the cycle of operation of the decade counter chain, the end carry pulse signal developed on the line 47 is applied to a terminal 108 of the deceleration control circuit to reset it to its initial condition. A manual reset signal may be applied to an input terminal 109. In addition, emergency stop and emergency stop feed-generator disable signals may be applied to terminals 110 and 111 of the deceleration control circuit to obtain operations which will be described more fully hereinafter in connection with FIGURES 8 and 9.

Referring now to FIGURE 2, a preferred form of the acceleration control circuit 68 is illustrated. Input terminals 71, 72 and 73 are respectively connected to base electrodes of transistors 112, 113 and 114 which operate as emitter-followers. The collectors of transistors 112, 113 and 114 are connected together and to a power supply terminal 115, which may preferably be at plus twenty volts relative to ground, and the emitters thereof are connected to ground through resistors 116, 117 and 118. The emitters are also connected through capacitors 119, 120 and 121 to circuit points 122, 123 and 124 which are respectively connected to ground through variable resistors 125, 126 and 127. The capacitors 119–121 together with the resistors 125–127 operate as differentiating circuits to develop at the circuit points 122–124 voltage signals having an amplitude proportional to the rate of change of signals applied to the input terminals 71–73. Since the signals applied to the input terminals 71–73 are proportional to the velocities of movement of the machine parts 21–23, the signals developed at circuit points 122–124 are proportional to the acceleration of the machine parts.

The acceleration signals developed at the circuit points 122, 123 and 124 are applied to the base electrodes of transistors 128, 129 and 130 which together operate as an OR circuit, the collectors being connected to the power supply terminal 115, while the emitters are connected together and to a circuit point 131. It may be noted that diodes 132, 133 and 134 are connected between the circuit points 122–124 and ground to limit the voltages applied to the base electrodes of the transistors 128–130.

The signal developed at circuit point 131, at the output of the OR circuit, is applied to the base electrode of a transistor 135, the first of three transistors 135, 136 and 137 operating as emitter-followers. The collectors of the transistors 135–137 are connected to the power supply terminal 115 while the emitters thereof are connected through resistors 138, 139 and 140 to ground. The emitter of transistor 135 is connected to the base of transistor 136 through the parallel combination of a capacitor 141 and a resistor 142, the base of transistor 136 being connected to ground through a resistor 143. The emitter of the second transistor 136 is connected directly to the base of the transistor 137, while the emitter of the transistor 137 is connected directly to the output terminal 67.

In operation, the voltages applied to the input terminals 71, 72 and 73, which are proportional to the speeds of movement of the machine parts 21, 22 and 23, are applied through the transistors 112–114 operated as emitter-followers, to the differentiating circuits including capacitors 119–121 and resistors 125–127. Voltages are produced at circuit points 122–124 proportional to the rate of change of the input voltages, to thus be proportional to acceleration. The acceleration signal having the highest amplitude is applied through one of the transistors 128–130, operating as an OR circuit, to the circuit point 131 and through the emitter-followers 135–137, a voltage is developed at the output terminal 67 proportional to the acceleration signal which has the highest amplitude.

Referring now to FIGURE 3, the coupling circuit 63 as above described, operates to develop an output signal at the output terminal 62 thereof, in response to input signals applied to the terminal 64 from the pulse generator 60, to the terminal 65, from the acceleration control circuit 68, or to the terminal 66 from the deceleration control circuit 70. In the general operation of the circuit, the output terminal 62 is normally at a certain positive potential which when applied to the variable frequency oscillator 58, establishes a certain frequency of operation thereof. For example, the variable frequency oscillator may be operated at 1070 kc. to cause operation of the pulse generator 50 at 200 kc. If the frequencies should tend to increase, the coupling circuit 63, operating in response to the pulses applied to terminal 64, decreases the potential of the output terminal 62, to reduce the frequency, thus producing a frequency stabilization action. During an initial portion of a programmed movement, a positive signal may be applied from the acceleration control circuit to the terminal 65 and through an inversion in the coupling circuit 63, the potential of the output terminal 62 is moved in a negative direction to decrease the operating frequencies. Similarly, during a final portion of a programmed movement, an increasingly positive signal is applied from the deceleration control circuit 70 to the terminal 66 and through an inversion in the coupling circuit 63, the potential of the output terminal 62 is moved in a negative direction, to decrease the operating frequency.

The coupling between input terminal 64 and output terminal 62 includes a capacitor 144 connected between ground and a circuit point 145 which is connected through a resistor 146 to the output terminal 62. Normally the capacitor is charged to place the circuit point 145 at a certain positive potential, and when pulses are applied to the input terminal 64 at an increased rate, the capacitor 144 is discharged to reduce the positive potential of the circuit point 145, thereby reducing the positive potential of the output terminal 62.

In particular, circuit point 145 is connected through a resistor 147 to a terminal 148 which is connected to a source of positive potential relative to ground, preferably plus twenty volts. Circuit point 145 is also connected through a diode 149 to the emitter of a transistor 150 having a grounded collector. The emitter of transistor 150 is also connected through a resistor 151 to the power supply terminal 148. The base of the transistor 150 is connected through a bias resistor 152 to a power supply terminal 153 at a negative potential relative to ground, preferably minus ninety volts, and is also connected to the input terminal 64 through the parallel combination of a capacitor 154 and a resistor 155. In operation, the capacitor 144 is charged through the resistor 147 toward the potential of the positive power supply terminal 148. The transistor 150 conducts only a small amount of current during intervals between application of negative pulses to the input terminal 64. However, when the negative pulses are applied, the transistor 150 conducts heavily, to discharge the capacitor 144. Accordingly, the average charge of the capacitor 144 and the average potential of the circuit point 145 is determined by the rate of application of pulses to the input terminal 64.

The signals applied to the input terminals 65 and 66 are inverted by a pair of transistors 156 and 157 and are applied to a transistor 158 which is operated as an emitter-follower coupled to the output terminal 62. In particular, the collectors of the transistors 156 and 157 are connected together and to the base of the transistor 158 and are also connected through a common load resistor 159 to the power supply terminal 148. The emitters of the transistors 156 and 157 are connected through resistors 160 and 161 to ground. The base of the transistor 156 is connected through a resistor 162 to ground, through a resistor 163 to the power supply terminal 148, and through a resistor 164 to the input terminal 65. The base of the transistor 157 is connected through a resistor 165 to ground, through a resistor 166 to the power supply terminal 148, and through a resistor 167 to the movable contact of a potentiometer 168 connected between ground and the emitter of a transistor 169 operated as an emitter-follower, the collector thereof being connected to terminal 148 and the base thereof being connected to input terminal 66.

It will be appreciated that when a positive voltage is applied to either of the input terminals 65 or 66, the conduction of one or the other of the transistors 156 and 157 will be increased to reduce the potential of the base of the transistor 158. When the potential of the base of the transistor 158 is decreased, the potential of the emitter thereof is also decreased to decrease the potential of the output terminal 62. In particular, the emitter of transistor 158 is connected through an adjustable resistor 170 to a circuit point 171 which is connected through a resistor 172 to the terminal 62. Circuit point 171 is also connected through an adjustable resistor 173 to a terminal 174 which may be connected to a suitable source of biasing potential. Preferably, the potential of the terminal 174 may be manually adjusted to provide a manual override or, if desired, the components may have values such that the resistor 173 may be manually adjusted to provide the manual override on the frequency of operation.

Referring now to FIGURE 4, the variable frequency oscillator 58 comprises a transistor 175 operated as an oscillator whose frequency is controlled by a voltage-controlled capacitor 176, the output of the oscillator being applied through a transistor 177 and a coupling transformer 178 to the output terminals 56, 60.

The voltage-controlled capacitor 176 is connected between the input terminal 61 and one end of a coil 179 the other end of which is grounded. A by-pass capacitor 180 is connected between terminal 61 and ground.

The coil 181, inductively coupled to the coil 179 is connected at one end to ground and at the other end to the base of the transistor 175 through a capacitor 182. The base is connected through a bias resistor 183 to ground and through a resistor 184 to the emitter thereof which is connected through a resistor 185 to a circuit point 186 connected through a resistor 187 to a power supply terminal 188 which may be at plus twenty volts relative to ground. A voltage-regulating diode 189 is connected between circuit point 186 and ground, and a capacitor 190 is connected between the emitter of transistor 175 and ground, to form with the resistor 185 a decoupling circuit. The collector of the transistor 175 is connected to a tap of the coil 179 and through a capacitor 191 to ground, the output voltage of the oscillator being developed across the capacitor 191. This voltage is applied through a capacitor 192 to the base of the transistor 177 which is connected to ground through a resistor 193 and to the circuit point 186 through a resistor 194. The emitter of the transistor 177 is connected through a resistor 195 to the circuit point 186 and through a capacitor 196 to ground, the resistor 195 and capacitor 196 forming a decoupling network. The collector of the transistor 177 is connected through a primary winding 197 of the transformer 178 to ground, the secondary 198 of the transformer being connected between the output terminals 56, 60.

It is not believed that a detailed description of the operation of the circuit of FIGURE 4 is necessary. It will be appreciated that the frequency of operation of the oscillator is controlled in part by the voltage-controlled capacitor 176. The input terminal 61 is normally at a positive potential relative to ground and as it goes more positive, the capacitance of the capacitor 176 goes down to increase the operating frequency. Similarly, as the potential of the input terminal 61 becomes less positive, the capacitance of the capacitor 176 increases and the frequency of operation decreases.

The fixed-frequency oscillator 57 may have a circuit substantially identical to that of the variable frequency oscillator, except that the voltage-controlled capacitor 176 and the by-pass capacitor 180 may be replaced by a single fixed capacitor connected across the coil 179.

Referring now to FIGURE 5, the circuit of the mixer 52 is quite simple and straightforward. The input terminals 53 and 54 are respectively connected to the emitter and base electrodes of a transistor 199, the emitter being also connected to a power supply terminal 200, preferably at plus twenty volts relative to ground. The collector of the transistor 199 is connected through a load resistor 201 to ground and through a low-pass filter network including series inductances 202, 203 and 204 and shunt capacitors 205, 206 and 207, the output being taken at an output terminal 208.

The transistor 199 is operated in a non-linear region to develop an output frequency equal to the difference between the frequencies of the fixed and variable frequency oscillators. The filter section removes all components except the difference frequency.

Referring now to FIGURE 6, the amplifier 51 also has a comparatively simple and straightforward circuit and includes three transistors 209, 210 and 211. The emitters of the transistors are grounded while the collectors are connected through resistors 212, 213 and 214 to a power supply terminal 215, preferably at plus twenty volts relative to ground. The base electrodes of the transistors are connected through resistors 216, 217 and 218 to ground and through resistors 219, 220 and 221 to the power supply terminal 215. A first coupling capacitor 222 connects an input terminal 223 to the base of the transistor 209, a second coupling capacitor 224 connects the collector of transistor 209 to the base of transistor 210, and a third coupling capacitor 225 connects the collector of transistor 210 to the base of the transistor 211, while the collector of the transistor 211 is connected directly to an output terminal.

Referring now to FIGURE 7, the pulse generator 50 is a monostable multivibrator which includes a normally non-conductive transistor 226 and a normally conductive transistor 227 the states of conduction thereof being reversed upon application of a triggering signal to an input terminal 228 to develop at an output terminal 229 connected to the collector of transistor 226 a negative pulse of a certain duration, preferably on the order of one microsecond.

The collectors of the transistors 226 and 227 are connected through resistors 230 and 231 to a power supply terminal 232, preferably at plus twenty volts relative to ground and the emitters thereof are connected to ground through resistors 233 and 234 and capacitors 235 and 236. The base electrodes of the transistors 226 and 227 are connected through bias resistors 237 and 238 to a common junction connected through a resistor 239 to a power supply terminal 240, preferably at minus ninety volts relative to ground. To limit the negative potential of the base electrodes, they are connected through diodes 241 and 242 to a circuit point 243 which is connected to ground through the parallel combination of a diode 245 and a resistor 246.

To render one transistor conductive while the other is non-conductive, the collector of transistor 226 is connected to the base of the transistor 227 through the parallel combination of a capacitor 247 and a resistor 248, while the collector of the transistor 227 is connected to the base of the transistor 226 through a capacitor 249, the base of transistor 226 being connected to ground through a resistor 250.

To trigger the circuit, the base of the transistor 226 is connected through a diode 251 to a circuit point 252 which is connected to the input terminal 228 through a coupling capacitor 253, circuit point 252 being connected to ground through a resistor 254.

In operation, the transistor 226 is normally non-conductive so that its collector and the output terminal 229 are at a potential approaching that of the terminal 232, and the transistor 227 normally conducts heavily because of its connection to the collector of transistor 226 through the resistor 248. When a signal of sufficient positive value is applied to the base of transistor 226 from the input terminal 228, the transistor 226 is switched to a conductive state while the transistor 227 is cut off. The charge of the capacitor 249 is then changed gradually until the potential of the base of the transistor 226 reaches a value such as to reduce conduction therethrough, whereupon the transistors are switched back to their initial states of conduction. Preferably, the timing elements, particularly the capacitor 249 and resistor 250, have values such as to produce a pulse having a duration of about one microsecond.

Referring now to FIGURES 8 and 9, the deceleration control circuit 70 is arranged to be activated at a certain point in a program cycle (for example at a 40% point), to produce at its output terminal 69 a voltage which gradually increases in a positive direction, to gradually decrease the frequency or rate of pulses on the line 49, and to thereby gradually slow down the movement of the machine parts. The deceleration control circuit 70 is also arranged to be activated in response to an emergency stop signal, applied to terminal 110.

The gradually increasing positive signal is produced by a ramp generator 255, coupled through an emitter-follower 256 to the output terminal 69. The ramp generator 255 is controlled from a flip-flop circuit 257 through an emitter-follower 258.

The flip-flop circuit 257 is set, to initiate operation of the ramp generator 255, in response to the concurrent application of an enabling signal applied to terminal 103 from the data distributor and storage system 25, and a signal to the terminal 105 at a certain point in a program cycle, preferably the 40% point. Such signals are applied through emitter-followers 259 and 260 to an AND gate 261 connected to a set input of the flip-flop circuit 257.

At the end of a program cycle, an end carry signal is applied to terminal 108 which is applied through an AND gate 262 to a reset input of the flip-flop circuit 257, the AND gate 262 being normally enabled by application of a positive signal from the terminal 110. When the flip-flop circuit 257 is reset, a signal is applied from the emitter-follower 258 to a ramp clear circuit 263 which places the ramp generator 255 at its initial condition.

An emergency stop may be accomplished at any time in the operation of the system by application of a negative signal to the terminal 110, which through an inverter 264 applies a set signal to the flip-flop 257, thereby initiating operation of the ramp generator 255 to produce an increasingly positive voltage at the output terminal 69 and to thereby slow down operation.

When the operation has been slowed down to a sufficiently low value, it is desirable that it be completely discontinued. For this purpose, the increasingly positive voltage developed at the output terminal 69 is applied through an emitter-follower 265 to a hook circuit 266 which develops an output signal when the voltage at the output terminal is sufficiently positive. The output of the hook circuit 266 is applied through an emitter-follower 267 to an AND gate 268, which is enabled under emergency stop conditions through the inverter 264 connected to the emergency stop input terminal 110. The output of the AND gate 268 is applied through an inverter 269 to the ouput terminal 111, which is coupled to the feed generator to discontinue application of pulses. For example, terminal 111 may be coupled to the gate circuit 48 (FIGURE 1) to discontinue applications of pulses.

During emergency stop conditions, it is desirable that the end carry pulse should not operate to reset the flip-flop 257, since the emergency stop may be desired near the end of a program cycle and the operation might not be slowed down sufficiently when the end of such a cycle is reached. Accordingly, the emergency stop signal applied to the terminal 110 is applied to the gate circuit 262 to close the gate and prevent application of the end carry pulse from terminal 108 to the flip-flop 257, the emergency stop signal applied to terminal 110 being of negative polarity.

It is also desirable that the flip-flop circuit 257 be reset whenever the emergency stop signal is discontinued and for this purpose, the terminal 110 is connected to a neon driver circuit 270 which is coupled to a pulser 271 to apply a reset pulse to the flip-flop 257 when the energizing stop signal is discontinued.

It should also be noted that the flip-flop 257 may be reset at any time by application of a signal to the terminal 109 connected to a reset input thereof.

Referring now to FIGURE 9, the ramp generator 255 comprises a capacitor 273 which is charged through a resistor 274 connected to the movable contact of a potentiometer 275. When the positive voltage is applied to the potentiometer 275, the voltage across the capacitor 273 gradually builds up in a positive direction. This voltage is applied to the emitter-follower 256 which consists of a transistor 276 having a base connected to the capacitor 273, having a collector connected to a power supply terminal 277, preferably at plus twenty volts relative to ground, and having an emitter connected to the output terminal 69 and also through a load resistor 278 to ground.

To apply the positive voltage to the ramp generator 255 the flip-flop circuit 257 is connected thereto through the emitter-follower 258. The flip-flop circuit 257 comprises a pair of transistors 279 and 280 having collectors connected to the power supply terminal 277 through resistors 281 and 282, having emitters connected to ground through resistors 283 and 284 and capacitors 285 and 286 and having base electrodes connected through resistors 287 and 288 to a common junction which is connected through a resistor 289 to a power supply terminal (shown in the lower right-hand portion of the figure) which is connected to a source of negative potential, preferably minus ninety volts relative to ground. To limit the negative voltage of the base electrodes, they are connected through diodes 291 and 292 to a circuit point 293 which is connected to ground through a resistor 294.

To cause one transistor to become non-conductive while the other is conductive, the collector of the transistor 279 is connected to the base of the transistor 280 through the parallel combination of a resistor 295 and a capacitor 296 and the collector of the transistor 280 is connected to the base of the transistor 279 through the parallel combination of a resistor 297 and a capacitor 298.

In the reset condition of the flip-flop circuit 257, the transistor 279 is non-conductive while the transistor 280 is conductive, so that when the flip-flop circuit is set, the potential of the collector of the transistor 280 rises from a low value to a value approaching that of the positive power supply terminal 277. This positive signal is applied through the parallel combination of a capacitor 299 and a resistor 300 to the base of a transistor 301 in the emitter-follower 258, the emitter of the transistor 301 being connected to the potentiometer 275 of the ramp generator 255 and also being connected through a load resistor 302 to ground.

As above indicated, the flip-flop 257 is triggered to its set condition by the concurrent application of an enabling signal from the storage system 25 to the terminal 103 and a signal at a certain point, preferably the 40% point, of a program cycle to the terminal 105. Terminals 103 and 105 are connected through the emitter-followers 259 and 260 to the gate circuit 261. The emitter-follower 259 comprises a transistor 304 having a base connected through a bias resistor 305 to the negative power supply terminal 290 and also connected through the parallel combination of a resistor 306 and a capacitor 307 to the input terminal 103, a collector connected to ground, and an emitter connected through a load resistor 308 to the positive power supply terminal 277. The emitter-follower 260 comprises a transistor 309 connected in identical fashion.

The AND gate 261 comprises a pair of diodes 310 and 311 connected between the emitters of the transistors 304 and 309 and a circuit point which is connected through a resistor 312 to the power supply terminal 277 and through a coupling capacitor 313 to a circuit point 314 connected to ground through a resistor 315. The circuit point 314 is also connected through a diode 316 to the base of the transistor 279 to apply a signal which triggers the flip-flop circuit 257 to its set condition.

Gate circuit 262 comprises a pair of diodes 317 and 318 connected between the terminals 108 and 110 and a circuit point 319 which is connected through a resistor 320 to the positive power supply terminal 277. Circuit point 319 is connected through a capacitor 321 to a circuit point 322 which is connected to ground through a resistor 323 and which is connected to the base of the transistor 280 through a diode 324. In operation, when a positive signal is applied to the terminal 110 as is normally the case except under emergency stop conditions, the application of an end carry pulse to the input terminal 108 is transmitted through the gate 262 and through capacitor 321 and diode 324 to the base of the transistor 280, to reset the flip-flop circuit 257.

When the flip-flop circuit 257 is reset, the ramp generator 255 is restored to its initial condition by the ramp clear circuit 263. In particular, when the flip-flop circuit 257 is reset, a negative signal is applied from the emitter of the emitter-follower transistor 301 and through a resistor 325 to the base of a transistor 326 in the ramp clear circuit 263, to cause the transistor 326 to conduct and discharge the capacitor 273 through a resistor 327. The base of the transistor 326 is connected through a resistor 328 to the negative power supply terminal 290, while the collector thereof is grounded.

When an emergency stop signal is applied to the terminal 110, a set signal is applied through the inverter 264 to set the flip-flop circuit 257 and thereby develop an increasingly positive voltage at the output terminal 69, to gradually decrease the rate of operation of the machine tool control. The inverter circuit 264 comprises a transistor 329 having a grounded emitter, having a base connected to terminal 110 through the parallel combination of a resistor 330 and a capacitor 331 and also connected to the negative power supply terminal 290 through a bias resistor 332 and having a collector connected through a resistor 333 to the positive power supply terminal 277. The collector of transistor 329 is connected through a resistor 334 to the base of the transistor 329 of the flip-flop circuit 257, to apply the set signal thereto.

When an emergency stop signal is applied and the operation has been slowed down sufficiently, the system operates automatically to discontinue operation. In particular, the increasingly positive voltage developed at the output terminal 69 is applied through the emitter-follower 265 to the hook circuit 266 which develops an output signal when the voltage at the output terminal is sufficiently positive. The emitter-follower 265 comprises a transistor 325 having its base connected to the output terminal 69 having its collector connected to the positive power supply terminal 277 and having its emitter connected through a load resistor 336 to ground. The hook circuit 266 comprises an output transistor 337 arranged to conduct through a load resistor 338 and a control transistor 339 interconnected with the transistor 337 to cause heavy current conduction through the load resistor 338 when the output of the emitter-follower 265 exceeds a certain threshold value.

The input signal to the hook circuit 266 is applied from the emitter of the transistor 335 through a resistor 340 to the emitter of the transistor 339. The collector of the transistor 339 is connected to the base of the transistor 337 and through a resistor 341 to ground. The base of the transistor 339 is connected to the collector of the transistor 337 and to the movable contact of a potentiometer 342 which is connected between ground and the positive power supply terminal 277. In operation, the transistor 339 does not conduct until the output of the emitter-follower 265 reaches a certain value, the base of the transistor 339 being at a certain positive potential is determined by the adjustment of the potentiometer 342. When the transistor 339 starts to conduct, a positive voltage is applied to the base of the transistor 337 to initiate conduction thereof and when the transistor 337 conducts, the potential of its collector and the base of the transistor 339 are lowered to increase conduction through the transistor 339 and thus increase conduction through the transistor 337. As a result, the transistor 337 conducts heavily when the input voltage exceeds a certain threshold value as determined by the adjustment of the potentiometer 342.

The output of the hook circuit 266 is applied to the emitter-follower 267 which includes a transistor 343 connected in a circuit arrangement substantially identical to that of the emitter-follower circuit 259 described above.

The output of the emitter-follower 267, taken at the emitter of the transistor 343, is applied through a diode 344 of the AND gate 268 to a circuit point 345 which is connected through a resistor 346 to the positive power supply terminal and through a diode 349 to the collector of the transistor 329 of the inverter 264.

Normally, the transistor 329 of the inverter 264 and the transistor 343 of the emitter-follower 267 are conductive and the potential of the circuit point 345 is at a relatively low value, close to ground potential. When an emergency stop signal is applied to the input terminal 110 and when, thereafter, the hook circuit 266 operates, both of the transistors 329 and 343 are rendered substantially non-conductive and a high positive voltage is developed at the circuit point 345. This voltage is applied to the inverter 269 which includes a transistor 348 connected in a circuit substantially identical to that of the inverter 264. The collector of the transistor 348 is connected to the terminal 111 which is so connected as to terminate application of pulses when the potential thereof drops to conduction of the transistor 348.

The neon driver and pulser circuits 270 and 271 are provided for the purpose of resetting the flip-flop circuit 257 when an emergency stop signal is terminated. As above described, the potential of the emergency stop input terminal 110 is normally at a certain positive potential and it may here be noted that this potential may be maintained through its connection to the positive power supply terminal 277 through a resistor 349, a regulating diode 350 being connected between terminal 110 and ground. Thus an emergency stop may be accomplished merely by grounding the terminal 110.

When an emergency stop signal is applied, as by grounding the terminal 110, a transistor 351 in the neon driver circuit 270 is caused to conduct to discharge a capacitor 352 down to a certain charge value. When the emergency stop signal is discontinued, the transistor 351 no longer conducts and the capacitor 352 is allowed to charge up until a voltage is reached sufficient to discharge through a neon tube 353. This generates a pulse in the pulser circuit 271 which is applied to the flip-flop circuit 257 to reset the same.

In particular, the emergency stop input terminal 110 is connected through a resistor 354 to the base of the transistor 351 which is connected through a resistor 355 to the negative power supply terminal 290, to place the potential of the base at a value above ground potential when an emergency stop signal is not applied, and to place the base at a value below ground potential when an emergency stop signal is applied. The emitter of the transistor 351 is connected through a resistor 356 to ground while the collector thereof is connected through a resistor 357 to the negative power supply terminal and also through a resistor 358 to a circuit point 359 which is connected through a resistor 360 to the negative power supply terminal, to one terminal of the neon tube 353 and through the capacitor 352 to ground. Thus when the transistor 351 conducts, after application of an emergency stop signal, the capacitor 352 is discharged to a certain value, by current flow through resistor 358, the transistor 351 and the resistor 356. When, thereafter, the transistor 351 is rendered non-conductive by termination of the emergency stop signal, the charge across the capacitor 352 is built up by current flow through the resistor 360 until a voltage is reached high enough to discharge the neon tube 353.

When the neon tube 353 discharges, a voltage is developed across a resistor 361, connected between ground and the neon tube 353. This voltage pulse is applied to a differentiating circuit including a capacitor 362 and a resistor 363. The output of the differentiating circuit is applied through a diode 364 to the base of a transistor 365 which is connected through a bias resistor 366 to the positive power supply terminal. The emitter of the transistor 365 is grounded while the collector thereof is connected through a load resistor 367 to the positive power supply terminal and also through a coupling capacitor 368 to a circuit point 369 which is connected through a diode 370 to the base of the transistor 280 in the flip-flop circuit 257, circuit point 369 being connected through a resistor 371 to ground. In operation, a negative pulse developed by the differentiating circuit 362, 363 is applied through the diode 364 to the transistor 365 to develop a positive pulse at the collector thereof which is applied through the capacitor 368 and the diode 370 to the transistor 280 to reset the flip-flop circuit 257.

FIGURE 10 shows one channel of the signal conversion and servo systems 30, used for controlling the machine part 21 in accordance with a pulse train applied on the line 31. It will be appreciated that identical channels may be used to control the machine parts 22 and 23 in accordance with pulse trains applied through lines 32 and 33, and it should also be noted that any number of additional channels may be used in a system constructed according to this invention.

The pulse train 31 from the gating matrix 26 is applied to a synchronizer circuit 372 to develop in response to each pulse an output pulse which is synchronized with a "B" pulse applied from a 100 kc. reference pulse source 373. The pulse source 373 also develops "A" pulses, out of phase with the "B" pulses, for a purpose to be described hereinafter.

The synchronized pulses developed by the synchronizer 372 are applied through a divide-by-two flip-flop 374 to sign gates 375, controlled through line 34 from the data distributor and storage system 25, to apply the pulses either on a "+x" line 376 or a "−x" line 377. Lines 376 and 377 are connected to a phase modulator 378 which develops a 200 cycle squarewave output on a line 379. When the pulses are applied on line 376 to the phase modulator, each pulse produces a certain phase lead in the 200 cycle squarewave output and when applied through the line 377 each pulse produces a certain phase lag in the 200 cycle squarewave output.

The 200 cycle squarewave signal on line 379 is applied to a phase demodulator 380 which compares the phase of the squarewave on line 379 with the phase of a sine wave signal applied on a line 381 and develops a D.C. output on a line 382 which is applied to the input of a servo system 383 having a mechanical output connected to the machine part 21, as diagrammatically indicated. The mechanical output of the servo system is also applied to a feedback resolver 384 having an electrical output connected to the line 381. An electrical input of the feedback resolver 384 is connected through a line 385 to a manual phase shift resolver 386 connected through a line 387 to a sine wave generator 388. A 200 cycle reference signal is applied through a line 389 to the sine wave generator 388, the 200 cycle reference signal being developed by a frequency divider 390 having an input supplied with the 100 kc. "A" pulses.

In operation, a shift in phase of the 200 cycle squarewave command signal applied through line 379 produces an output on the output line 382 of the phase modulator 380 which is applied to the servo system 383 to cause movement of the machine part. As the machine part moves, the feedback resolver 384 shifts the phase of the 200 cycle signal applied on line 381 toward that of the command signal applied on line 379. After effecting control in accordance with one train of command pulses, the signal applied on line 381 is brought into phase with the command signal applied on line 379 and the total accumulative phase shifts of both the command and reference signals are equal to each other and are proportional to the movement of the machine part 21. It will be appreciated that the manual phase shift resolver 386 provides a manual override.

The synchronizer 372 comprises a first flip-flop 391 which is shifted from a reset condition to a set condition by a pulse applied on line 31 from the gating matrix 26. When the flip-flop 391 is set, an AND gate is enabled to apply a "B" pulse from the pulse source 373 to a second flip-flop 394, which is then shifted from a reset condition to a set condition. The next succeeding "B" pulse applied through AND gate 392 to the flip-flop 394 shifts it from its set condition back to its reset condition, and an output pulse is applied over a line 395 to a reset input of the flip-flop 391 to shift the flip-flop 391 from its set condition back to its reset condition. An output pulse is then developed on a line 395, synchronized with a "B" pulse, and the flip-flop 391 is then in condition to respond to the next pulse of the pulse train applied over line 31 from the gating matrix 26.

The synchronized pulse developed on line 395 to the divide-by-two flip-flop 374, the output of which is applied to the sign gates 375. The flip-flop 374 is not necessarily required, but is provided to obtain a desired ratio between information coded on the tape and corresponding movement of machine tool elements in a particular system.

The phase modulator 378 comprises a frequency divider 396 having an input connected through a gate circuit 397 to an adder circuit 398 having two inputs, one being connected to the "+x" line 376 and the other being supplied with "A" pulses over a line 399. Prior to reading of a block of tape information, the frequency divider 396 is controlled solely by the 100 kc. "A" pulses applied over the line 399 and the output of the frequency divider is a 200 cycle squarewave signal of fixed phase. After a block of information is read from the tape, a train of command pulses is applied either through the "+x" line 376 to the adder 398 or through the "−x" line 377 to a flip-flop circuit 400 which controls the gate circuit 397.

When a train of "+x" command pulses is applied through line 376, each pulse is applied to the frequency divider 396 at a time between pulses from the 100 kc. source to create a certain phase lead in the output of the divider. On the other hand, when a train of command pulses is applied over the "−x" line 377, each pulse operates the flip-flop circuit 400 to close the gate 397 and delete one of the 100 kc. pulses. Thus a certain phase lag is created in the output of the frequency divider.

The command pulses, whether applied over the line 376 or the line 377 are in phase with the "B" pulses and out of phase with the "A" pulses. To properly operate the gate 397 so as to delete only one of the 100 kc. "A" pulses in response to each "−x" command pulse applied over the line 377, it is necessary that the gate 397 be closed only for a certain time interval. This is accomplished by applying a reset signal to the flip-flop 400 through a gate circuit 401 having an input connected through a line 402 to the "B" pulse source. In operation, the flip-flop 400 is normally in a reset condition and the gate 397 is opened. When a "−x" command pulse is applied through line 377, the flip-flop circuit 400 is placed in a set condition and the gate circuit 397 is closed to delete the next "A" pulse applied from line 399. At the same time, the gate 401 is opened and the next "B" pulse applied through line 402 serves to reset the flip-flop 400, to again open the gate 397 while closing the gate 401.

The phase demodulator 380 comprises a pair of flip-flops 403 and 404 which are respectively set by the leading edges of command and reference squarewaves on lines 405 and 406, and are respectively reset by the trailing edges of the reference and command squarewaves on lines 406 and 405. The reset and set outputs of the flip-flops 403 and 404 are applied to a summing amplifier 407 which is connected to an averaging circuit 408, the output of which is taken on line 382. The command squarewave on line 405 is developed from the squarewave on line 379 through an amplifier 409, while the reference squarewave on line 406 is developed by a squaring circuit 410, to which a sine wave signal is applied from the line 381 through an amplifier 411. The set signals are applied to the flip-flops 403 and 404 from the lines 405 and 406 through pulse amplifiers 412 and 413. With this arrangement, a D.C. signal is developed on the line 382 having a magnitude and polarity corresponding to the difference in phase between the signals applied to lines 379 and 381.

It will be understood that modifications and variations may be effected without departing from the spirit and scope of the novel concepts of this invention.

I claim as my invention:

1. In a system for effecting the programmed movement of an element, a servo system for moving said element, cyclically operable command signal generator means having first and second control signal inputs and arranged to apply a command signal to said servo system to move said element at a velocity proportional to the product of the values of signals applied to said inputs, control means for normally applying a first signal of fixed value to said first input, program means for applying a second signal to said second input to normally produce a certain velocity of movement of said element in each cycle of operation of said generator, and means for modifying the operation of said control means to increase said first signal from a low value to said fixed value during an initial portion of a cycle of operation.

2. In a system for effecting the programmed movement of an element, a servo system for moving said element, cyclically operable command signal generator means having first and second control signal inputs and arranged to apply a command signal to said servo system to move said element at a velocity proportional to the product of the values of signals applied to said inputs, control means for normally applying a first signal of fixed value to said first input, program means for applying a second signal to said second input to normally produce a certain velocity of movement of said element in each cycle of operation of said generator, and means for modifying the operation of said control means to decrease said first signal from said fixed value to a low value during a final portion of a cycle of movement.

3. In a system for effecting the programmed movement of an element, a servo system for moving said element, cyclically operable command signal generator means having first and second control signal inputs and arranged to apply a command signal to said servo system to move said element at a velocity proportional to the product of the values of signals applied to said inputs, control means for normally applying a first signal of fixed value to said first input, program means for applying a second signal to said second input to normally produce a certain velocity of movement of said element in each cycle of operation of said generator, and means for modifying the operation of said control means to increase said first signal from a low value to said fixed value during an initial portion of a cycle of operation and to decrease said first signal from said fixed value to a low value during a final portion of a cycle of operation.

4. In a system for effecting the programmed movement of an element, a servo system for moving said element, cyclically operable command signal generator means having first and second control signal inputs and arranged to apply a command signal to said servo system to move said element at a velocity proportional to the product of the values of signals applied to said inputs, control means for normally applying a first signal of fixed value to said first input, program means for applying a second signal to said second input to normally produce a certain velocity of movement of said element in each cycle of operation of said generator, means for developing a signal proportional to acceleration of said element, and means responsive to said acceleration signal for controlling said control means to reduce said first signal below said fixed value in proportion to the acceleration of said element.

5. In a system for effecting the programmed movement of an element, a servo system for moving said element, cyclically operable command signal generator means having first and second control signal inputs and arranged to apply a command signal to said servo system to move said element at a velocity proportional to the product of the values of signals applied to said inputs, control means for normally applying a first signal of fixed value to said first input, program means for applying a second signal to said second input to normally produce a certain velocity of movement of said element in each cycle of operation of said generator, means operable during a final portion of a cycle of operation to develop a gradually changing signal, and means responsive to said gradually changing signal for controlling said control means to reduce said first signal.

6. In a system for effecting the programmed movement of an element, a servo system for moving said element, cyclically operable command signal generator means having first and second control signal inputs and arranged to apply a command signal to said servo system to move said element at a velocity proportional to the product of the values of signals applied to said inputs, control means for normally applying a first signal of fixed value to said first input, program means for applying a second signal to said second input to normally produce a certain velocity of movement of said element in each cycle of operation of said generator, means for developing a signal proportional to the velocity of said element, differentiating circuit means responsive to said velocity signal to develop an acceleration signal, and means responsive to said acceleration signal for controlling said control means to reduce said first signal below said fixed value in proportion to the acceleration of said element.

7. In a system for effecting the programmed movement of an element, a servo system for moving said element, cyclically operable command signal generator means having first and second control signal inputs and arranged to apply a command signal to said servo system to move said element at a velocity proportional to the product of the values of signals applied to said inputs, control means for normally applying a first signal of fixed value to said first input, program means for applying a second signal to said second input to normally produce a certain velocity of movement of said element in each cycle of operation of said generator, means for developing a gradually changing signal, and means responsive to said gradually changing signal for controlling said control means to reduce said first signal.

8. In a system for effecting the programmed movement of an element, a servo system for moving said element, cyclically operable command signal generator means having first and second control signal inputs and arranged to apply a command signal to said servo system to move said element at a velocity proportional to the product of the values of signals applied to said inputs, control means for normally applying a first signal of fixed value to said first input, program means for applying a second signal to said second input to normally produce a certain velocity of movement of said element in each cycle of operation of said generator, means for developing a gradually changing signal, means responsive to said gradually changing signal for controlling said control means to reduce said first signal, and means for discontinuing operation of said generator means when said first signal is reduced to a certain value.

9. In a system for effecting the programmed movement of a plurality of elements, servo systems for moving said elements, cyclically operable command signal generator means having a first input and having a plurality of additional inputs corresponding to said elements and arranged to apply command signals to said servo systems to move said elements at rates proportional to the products of the values of signals applied to said first input and the value of signals applied to said additional inputs, control means for normally applying a first signal of fixed value to said first input, program means for applying control signals to said additional inputs to normally produce certain velocities of movements of said elements in each cycle of operation of said generator means, and means for modifying the operation of said control means to increase said first signal from a low value to said fixed value during an initial portion of a cycle of operation and to decrease said first signal from said fixed value to a low value during a final portion of a cycle of operation.

10. In a system for effecting the programmed movement of a plurality of elements, servo systems for moving said elements, cyclically operable command signal generator means having a first input and having a plurality of additional inputs corresponding to said elements and arranged to apply command signals to said servo systems to move said elements at rates proportional to the products of the values of signals applied to said first input and the value of signals applied to said additional inputs, control means for normally applying a first signal of fixed value to said first input, program means for applying control signals to said additional inputs to normally produce certain velocities of movements of said elements in each cycle of operation of said generator means, means for developing a plurality of acceleration signals respectively proportional to the acceleration of said elements, and means responsive to the acceleration signal having the highest magnitude for controlling said control means to reduce said first signal below said fixed value in proportion to the magnitude of said acceleration signal.

11. In a system for effecting the programmed movement of an element, a servo system for moving said element, cyclically operable command signal generator means having first and second control signal inputs and arranged to apply a command signal to said servo system to move said element at a velocity proportional to the product of the values of signals applied to said inputs, control means for normally applying a first signal of fixed value to said first input, program means for applying a second signal to said second input to normally produce a certain velocity of movement of said element in each cycle of operation of said generator, means including a tachometer generator for developing a signal proportional to the velocity of said element, differentiating circuit means responsive to said velocity signal to develop an acceleration signal, and means responsive to said acceleration signal for controlling said control means to reduce said first signal below said fixed value in proportion to the acceleration of said element.

12. In a system for effecting the programmed movement of an element, a servo system for moving said element, cyclically operable command signal generator means arranged to complete a cycle of operation in response to application of a certain number of pulses thereto and arranged to apply to said servo system a train of pulses equal in number to a controllable fraction of said certain number of pulses, pulse generator means normally operative to apply pulses to said signal generator means at a certain rate, program means for controlling said generator means to control said controllable fraction, a digital-analog converter responsive to said train of pulses for developing a velocity signal, differentiating circuit means responsive to said velocity signal to develop an acceleration signal, and means responsive to said acceleration signal for controlling said pulse generator means to reduce the pulse rate thereof below said certain rate in proportion to the acceleration of said element.

13. In a system for effecting the programmed movement of an element, a servo system for moving said element, cyclically operable command signal generator means arranged to complete a cycle of operation in response to application of a certain number of pulses thereto and arranged to apply to said servo system a train of pulses equal in number to a controllable fraction of said certain number of pulses, a fixed frequency oscillator, a variable frequency oscillator, mixer means responsive to the outputs of said oscillators for developing a signal having a frequency equal to the difference in frequencies of said oscillators, pulse generator means responsive to said difference frequency signal, means for applying pulses from said pulse generator means to said signal generator means, and means for controlling the frequency of said variable frequency oscillator for gradually accelerating and decelerating movement of said element during initial and final portions of said cycle of operation.

14. In a system for effecting the programmed movement of an element, a servo system for moving said element, cyclically operable command signal generating means having first and second control signal inputs and arranged to apply a command signal to said servo system to move said element in a velocity proportional to the product of the values of signals applied to said inputs, control means for normally applying a first signal of fixed value to said first input, program means for applying a second signal to said second input to normally produce a certain velocity of movement of said element in each cycle of operation of said generator, resistance-capacitance circuit means for developing a gradually changing signal, a flip-flop circuit for controlling operation of said resistance-capacitance circuit means, means for setting said flip-flop circuit at a predetermined point in said cycle of operation to initiate operation of said resistance-capacitance means, means responsive to said gradually changing signal for controlling said control means to reduce said first signal, and means for resetting said flip-flop circuit at the end of a cycle of operation.

15. In a system for effecting the programmed movement of an element, a servo system for moving said element, cyclically operable command signal generator means having first and second control signal inputs and arranged to apply a command signal to said servo system to move said element at a velocity proportional to the product of the values of signals applied to said inputs, means including a variable frequency oscillator for applying a pulse signal to said first input, means responsive to said pulse signal to control said variable frequency oscillator to normally stabilize the rate of said pulse signal at a certain value, program means for applying a second signal to said second input to normally produce a certain velocity of movement of said element in each cycle of operation of said generator, and means for varying the frequency of said variable frequency oscillator in a certain portion of the cycle of operation.

References Cited in the file of this patent
UNITED STATES PATENTS
3,015,806    Wang _____ Jan. 2, 1962